H. A. PERNOT.
APPARATUS FOR CLOSING CONTAINERS BY PRESSURE.
APPLICATION FILED MAY 21, 1919.
1,329,140.
Patented Jan. 27, 1920.
2 SHEETS—SHEET 1.
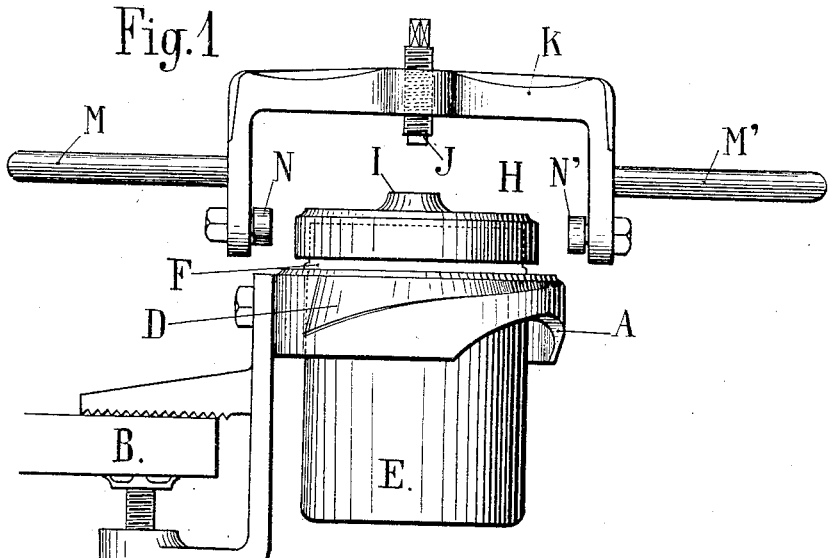
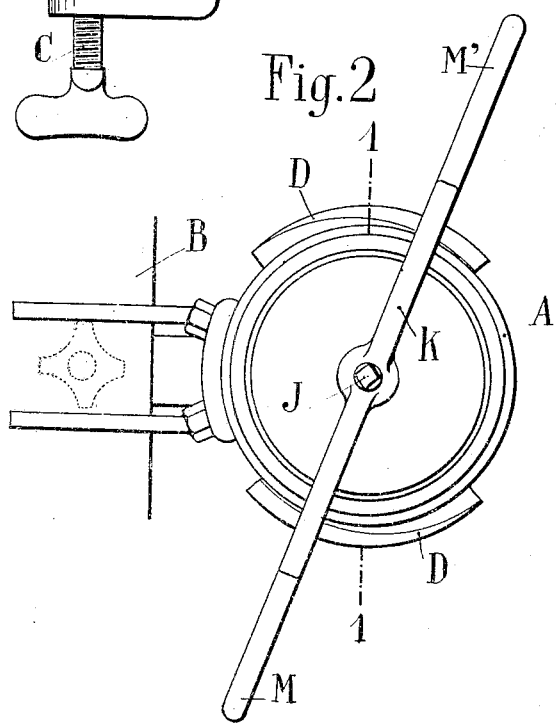

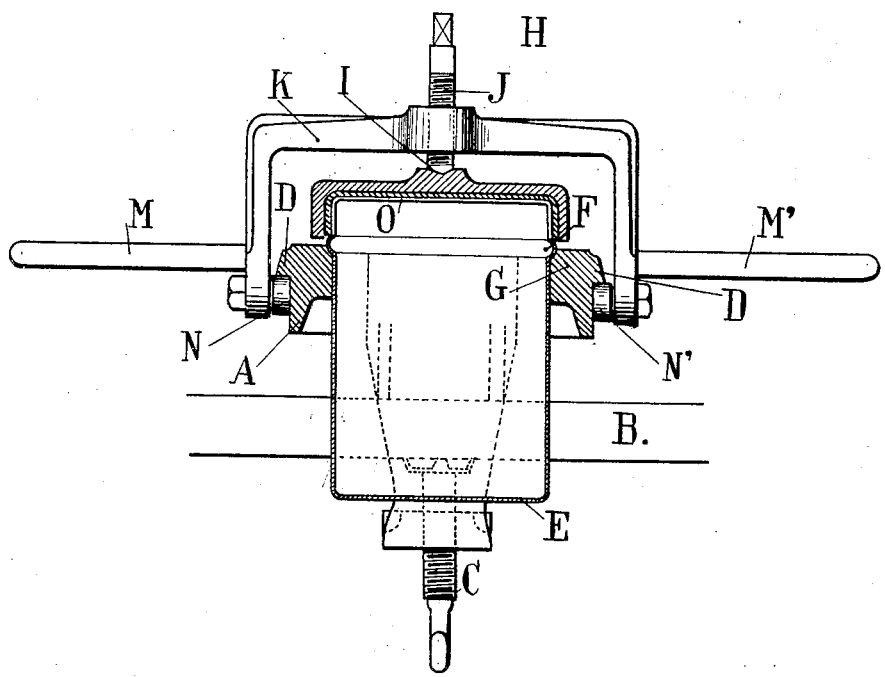

UNITED STATES PATENT OFFICE.

HENRI ALEXANDRE PERNOT, OF PARIS, FRANCE, ASSIGNOR TO COMPAGNIE DES BOUCHAGES HERMETIQUES-SIMPLEX, OF PARIS, FRANCE, A CORPORATION OF FRANCE.

APPARATUS FOR CLOSING CONTAINERS BY PRESSURE.

1,329,140.  Specification of Letters Patent.  Patented Jan. 27, 1920.

Application filed May 21, 1919. Serial No. 298,782.

*To all whom it may concern:*

Be it known that I, HENRI ALEXANDRE PERNOT, of 38 Rue du Retrait, Paris, France, engineer, have invented a new and useful Apparatus for Closing Containers by Pressure, which apparatus is fully set forth in the following specification.

This invention has for its object simple and portable apparatus for closing containers by pressure. This apparatus on account of its simplicity and small bulk is particularly useful for home use.

Hitherto such apparatus or rather machines intended to be employed for this purpose have been bulky because the same machine was designed to be employed indiscriminately for closing containers of different heights and diameters. It was therefore necessary to make it sufficiently high to take the tallest receivers, and when less tall containers were to be closed it was necessary to employ wedges or an arrangement which allowed the head of the machine to be lowered or its base plate to be raised.

According to this invention, the container is during closure supported by the bead or the like upon it.

In the accompanying drawings which illustrate the invention, Figure 1 is an elevational view with a portion of the supporting collar for the container cut away to better disclose its construction, Fig. 2 a plan, while Fig. 3 is a section on the line 1—1 of Fig. 2 of an apparatus in use.

With reference to the drawings A is a strong collar conveniently of cast iron which supports the container and which is fixed to a table B by means of a screw in such a manner as to leave a clear space beneath it. The edge of the collar is provided with two inclines D each of which occupies less than half the periphery of the collar; the central hole is such that the containers E to be closed fit exactly therein and rest upon packing F in a recess G. In order that containers of less diameter can be closed, rings of different diameter similar to kitchen grate rings may be placed in this recess. The bead or the like of the container to be closed rests in the recess; the cover is then placed thereon and this is itself covered by a well fitting cover H conveniently of cast iron. The cover H is provided with central boss I upon which bears the screw J carried by a stirrup K. The stirrup is provided with the handle MM¹ and also with two rollers NN¹ whose distance apart is exactly equal to the outside diameter of the collar and which in order to move downward into position are placed opposite the free space left between the ends of the inclines D.

The point of the screw J is now brought upon the boss I and the screw so adjusted that the two rollers are in position at the commencement of the cams; the stirrup with the screw as axis is then rotated using the handles MM¹ for this purpose and strong pressure is thus exerted upon the cover H which in its turn presses on the cover O; this cover O is therefore forced upon the top of the container to be closed. The stirrup is thereupon moved in the reverse direction so that it can be withdrawn after which the cover H and the container closed by a perfectly positioned cover may be withdrawn.

The apparatus can be employed for containers of all shapes and of all sizes which either are provided with a bead or the like or which are conical. When the containers are not circular, spare rings and covers H of suitable shape are employed.

In all machines hitherto in use the container is supported at the base while in this construction all the closure pressure is taken by the bead.

The apparatus may also be employed for bottling.

The details of the apparatus may vary, thus the collar may be provided with rollers and the inclines be attached to the stirrup.

Claim:

In a manually operated device for applying covers to cans adapted to be supported during closure by an enlargement of the body portion of the can, a can supporting collar for receiving said can, said collar having a seat on which the enlarged portion of the can is adapted to rest, and having diametrically oppositely disposed and equally spaced cam surfaces, a cover applying cap having a central bearing and means for applying clamping pressure to said cap comprising a yoke-shaped screw-clamp revolubly supported on said bearing and having anti-friction engagement with said cam surfaces.

In testimony whereof I have signed this specification.

HENRI ALEXANDRE PERNOT.

Witnesses:
 FRÉDERIC MARLÉ,
 GASTON BRUNDO.